(12) United States Patent
Lintz

(10) Patent No.: US 12,155,619 B2
(45) Date of Patent: Nov. 26, 2024

(54) METHODS AND SYSTEMS FOR PROVIDING SUPPLEMENTAL DATA

(71) Applicant: Comcast Cable Communications, LLC, Philadelphia, PA (US)

(72) Inventor: Christopher Lintz, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/200,358

(22) Filed: Mar. 12, 2021

(65) Prior Publication Data

US 2022/0038412 A1 Feb. 3, 2022

Related U.S. Application Data

(63) Continuation of application No. 13/779,069, filed on Feb. 27, 2013, now Pat. No. 10,986,063.

(51) Int. Cl.
*H04L 51/52* (2022.01)
*G06Q 50/00* (2012.01)

(52) U.S. Cl.
CPC .............. *H04L 51/52* (2022.05); *G06Q 50/01* (2013.01)

(58) Field of Classification Search
CPC ..... H04L 51/32; H04L 12/1822; H04L 51/52; G06Q 50/01; H04N 21/4788
See application file for complete search history.

(56) References Cited

U.S. PATENT DOCUMENTS

| 5,978,912 | A | 11/1999 | Bakavy et al. |
| 6,167,511 | A | 12/2000 | Lewis |
| 6,324,644 | B1 | 11/2001 | Rakavy et al. |
| 6,594,757 | B1 | 7/2003 | Martinez |
| 6,609,151 | B1 | 8/2003 | Khanna et al. |
| 6,732,159 | B1 | 5/2004 | Levine et al. |
| 6,732,267 | B1 | 5/2004 | Wu et al. |
| 6,882,967 | B2 | 4/2005 | Levine et al. |
| 6,918,062 | B2 | 7/2005 | Wang et al. |
| 7,013,385 | B2 | 3/2006 | Abbondanzio et al. |
| 8,555,177 | B1 | 10/2013 | Junee et al. |
| 8,700,714 | B1* | 4/2014 | Pan ................ H04N 21/4751 709/206 |
| 8,819,719 | B1 | 8/2014 | Chen et al. |
| 9,332,313 | B2 | 5/2016 | Phillips et al. |
| 9,749,366 | B1 | 8/2017 | Ramalingam et al. |
| 9,871,757 | B1 | 1/2018 | Reardon |
| 2004/0205329 | A1 | 10/2004 | Wu et al. |
| 2007/0198325 | A1* | 8/2007 | Lyerly ................ G06Q 10/06 705/7.41 |
| 2007/0220244 | A1 | 9/2007 | Mahmoud et al. |
| 2008/0132799 | A1 | 6/2008 | Xue |
| 2009/0158021 | A1 | 6/2009 | Joshi et al. |
| 2009/0177877 | A1 | 7/2009 | Holdaway et al. |
| 2010/0223454 | A1 | 9/2010 | Bolay et al. |
| 2011/0246560 | A1 | 10/2011 | Gibson |

(Continued)

*Primary Examiner* — Chirag R Patel
(74) *Attorney, Agent, or Firm* — Ballard Spahr LLP

(57) ABSTRACT

Methods and systems for providing supplemental data are disclosed. An exemplary method can comprise determining content currently being consumed by a user, determining one or more user preferences for display of supplemental data, retrieving supplemental data according to the one or more user preferences, and providing the supplemental data to the user concurrently with the content currently being consumed.

26 Claims, 6 Drawing Sheets

(56) References Cited

U.S. PATENT DOCUMENTS

| | | |
|---|---|---|
| 2011/0321062 A1 | 12/2011 | Pope et al. |
| 2012/0060105 A1* | 3/2012 | Brown .................. H04L 51/224 |
| | | 715/753 |
| 2012/0144311 A1 | 6/2012 | Yeh et al. |
| 2012/0151322 A1 | 6/2012 | Lindsay et al. |
| 2012/0233212 A1 | 9/2012 | Newton et al. |
| 2012/0296972 A1* | 11/2012 | Backer .................. G06F 3/0481 |
| | | 709/204 |
| 2012/0303644 A1 | 11/2012 | Martin, Jr. et al. |
| 2013/0004138 A1 | 1/2013 | Kilar et al. |
| 2013/0036169 A1 | 2/2013 | Quigley et al. |
| 2013/0104024 A1 | 4/2013 | Rajkumar et al. |
| 2013/0198655 A1 | 8/2013 | Whitnah et al. |
| 2013/0238390 A1 | 9/2013 | Hariharan et al. |
| 2013/0298000 A1 | 11/2013 | Zuccarino et al. |
| 2014/0041038 A1 | 2/2014 | Lessin et al. |

* cited by examiner

METHODS AND SYSTEMS FOR PROVIDING SUPPLEMENTAL DATA

CROSS-REFERENCE TO RELATED PATENT APPLICATION

This application is a continuation of U.S. Non-Provisional application Ser. No. 13/779,069, filed on Feb. 27, 2013, the entirety of which is incorporated by reference herein.

BACKGROUND

Content delivery networks provide users with content in various formats. The users receiving this content may wish to communicate with others about the content through, for example, social networks. Social networks provide users with an opportunity to communicate and comment in a variety of ways on a variety of topics. Social networks, however, have not been integrated with content players so that users can utilize the social networks to access information and comments related to content. Thus, there is a need for more sophisticated methods and systems for providing content with social data and other relevant data to users.

SUMMARY

It is to be understood that both the following general description and the following detailed description are exemplary and explanatory only and are not restrictive, as claimed.

Provided are methods and systems for providing supplemental data. The method can comprise determining content currently being consumed by a user. The method can also comprise aggregating internal analytics, external analytics, internal social data, and/or external social data associated with the user and the content. The method can comprise generating a message based on one or more of the internal analytics, the external analytics, the internal social data, and the external social data The method can further comprise providing the message concurrently with the content.

In one aspect, an exemplary method can comprise determining content currently being consumed by a user, determining one or more user preferences for display of supplemental data, retrieving supplemental data according to the one or more user preferences, and providing the supplemental data to the user concurrently with the content currently being consumed.

In another aspect, an exemplary system can comprise an analytic element, configured for obtaining internal analytics and/or external analytics. The system can comprise a social data element configured for obtaining internal social data and external data. The system can also comprise a content player configured for providing content to a user. The system can further comprise a data display element configured for rendering a message concurrently with the provided content. The message can be based on one or more of the internal analytics, the external analytics, the internal social data, and the external social data Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
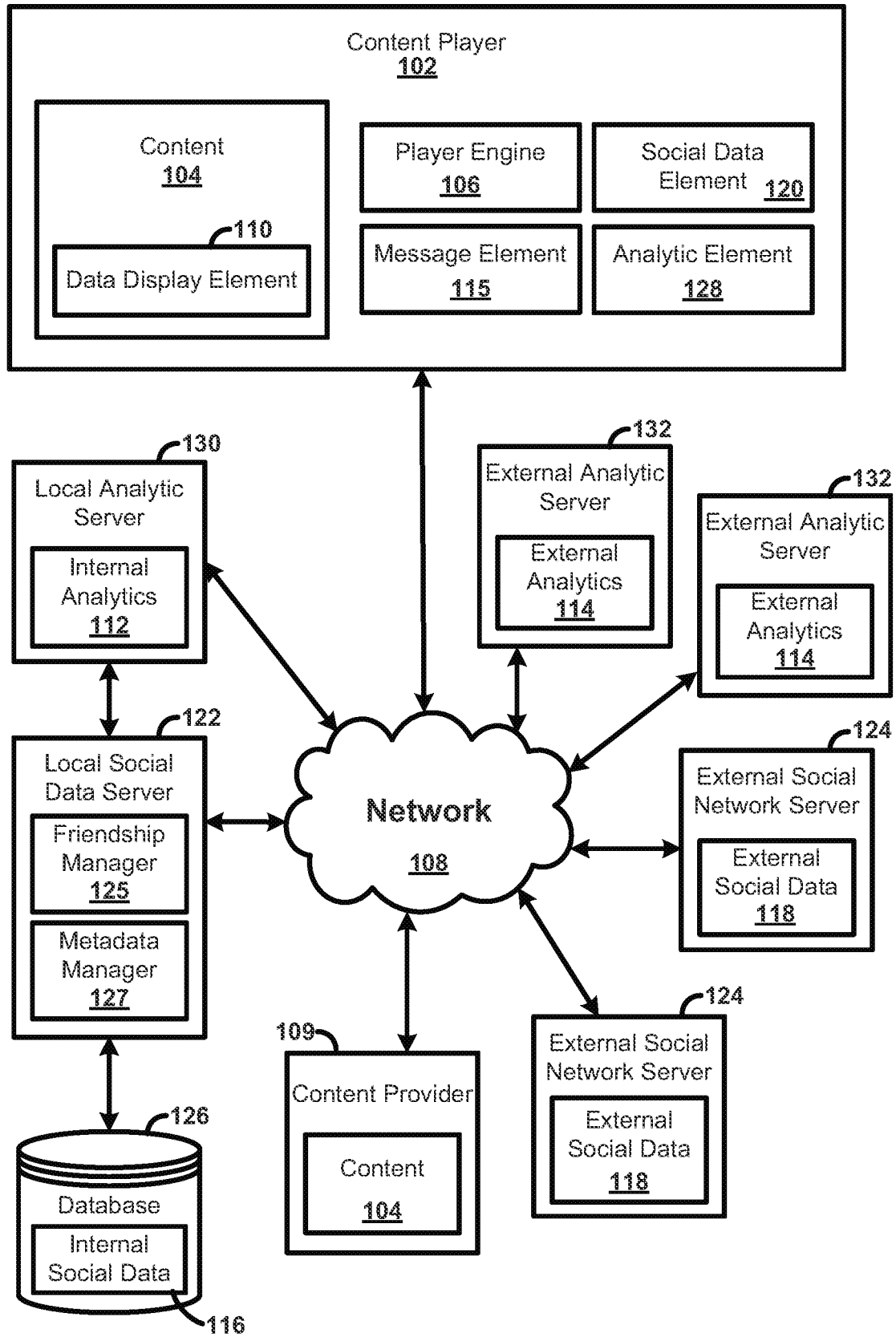
FIG. 1 illustrates an exemplary system for providing supplemental data.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are systems and methods that can store, manage, and/or deliver social data and analytics in conjunction with related content. In one aspect, relationships between customer accounts can be created, deleted, and/or discovered by customers. Relationships between customers can comprise, for example, relationships based on geographic location, content viewing behavior, demographic information, common interests, and the like. Relationships can be created between a customer and users of social networks who are not customers. Relationships can be created by the user or created automatically. For example, a user can search for another user on one or more internal or external social networks. In one aspect, relationships are created and/or deleted through external third party social networks. A user can have different categories of relationships such as friend, family, coworker, neighbor, and the like. In one aspect, customers can establish and discover internal customer relationships through a set of discovery and privacy controls. For example, a customer could allow a name, screen name (or alias), email, phone number, content interests, and the like to be part of a discovery or search service based on privacy controls. In another aspect, this customer information can be discovered when browsing the guide or reading content summaries, users can be given the option to not only read customer reviews but also establish friendships with customers that have provided reviews. As explained in further detail below the Friendship Manager 125 of FIG. 1 can manage and maintain friendships among internal users, e.g., customers.

In one aspect, supplemental data can be provided to the user. By way of example, the supplemental data can be related to content being consumed by a user. Supplemental data can comprise, for example, social data and/or analytic data, and the like. Supplemental data can be provided to the user from external, third party networks and/or an internal network. In another aspect, external social network integration can allow users to exchange social data with one or more third party social networks, such as Facebook, Twitter, and the like. For example, users can access third party social networks by providing account information. Social data can be sent to third party social networks and/or internal social networks. In an aspect, social data can be received by downloading social data or by receiving social data feed updates. Third party social networks can be accessed, for example, through use of an application programing interface (API). In one aspect, an API can provide access to function calls, variables, user data, and the like to communicate with the third party social network. As two examples, both Facebook and Twitter have publicly available APIs. Through the Facebook API, third party applications are able to allow a Facebook user to sign in to the third party application using Facebook login credentials. Through a third party application using the Facebook API, users are then able to post messages, issue Likes and interact with their friend list. In a similar manner the Twitter API can be accessed by a third party application to expose Twitter functionality to third party applications.

In a further aspect, global social metadata relevant to sets of users can be delivered to users whether or not they have relationships created. For example, sets of users can comprise users having features in common such as geographic location, content viewing behavior, demographic information, common interests, and the like. In one aspect, global social metadata can comprise one or more metrics that summarize an audience group (or set) by any characteristic. For example, there can be a set of users who have a good sentiment or "Liked" a movie or show. Another set of users could have the opposite sentiment. In another aspect, global social metadata can comprise information such as "X number of people are viewing a show simultaneously" or "Y number of sports enthusiasts are watching the game."

In an aspect, a user can comment on, or interact with, a user interface to express an interest level in content. Any comment and expression entered by a user can be stored along with an offset (identifying a time corresponding to one or more frames or other portion of the content that the user has associated with a comment or expression) and an identifier uniquely identifying the content. Accordingly, a user can view content at a particular offset where social data exists (global or relationship based) and a social data element can be triggered to display the social data in conjunction with the content.

FIG. 1 illustrates an exemplary system for providing supplemental data. The system can comprise a content player 102. In an aspect, the content player 102 can be configured for providing content 104 to a user. For example, the content 104 can comprise one or more of audio, video, an image, and/or an electronic book. The content player 102 can be a TV, computer, smart phone, tablet, e-reader, or other electronic device capable of receiving and displaying content 104 to a user. In an aspect, the content player 102 can comprise a fragmented MPEG-4 (fMP4) player, QuickTime player, avi player, real media player, MPEG-2 player, MPEG-4 player, DivX, Ogg player, windows media player, NTSC player, PAL player, DVD player, Blue-ray player and the like. The content player 102 can comprise a player engine 106. The player engine 106 can be a player engine that can process content 104 encoded in one or more content formats, such as fMP4 and the like. In an aspect, the content player 102 can receive content 104 from a network 108 such as the Internet or other communication network. For example, the content player 102 can receive content 104 through a content delivery network from a content provider 109. Thus, the network 108 can comprise a content delivery network, such as an internet protocol based delivery network and/or quadrature amplitude modulation based delivery network.

The system can further comprise a data display element 110. In an aspect, the data display element 110 can be configured for rendering a message concurrently with the provided content 104. The message can be based on one or more of internal analytics 112, external analytics 114, internal social data 116, and external social data 118. For example, the content player 102 can comprise a message element 115 configured to generate one or more messages based on the internal analytics 112, external analytics 114, internal social data 116, and/or external social data 118. Internal analytics 112 can comprise, for example, content metrics. For example, content metrics can comprise real-time content metrics and/or historic content metrics. Generally, content metrics can comprise viewership popularity, viewership trends, channel change time, errors, license information, unique content identifiers, and the like. Real-time content metrics can comprise content metrics currently being collected (e.g., collected within X number of seconds). Real-time metrics can provide many benefits to the user as well as the content provider. As one example, knowing what content is popular at a present time can benefit the user in content discovery and a content provider from an advertising perspective. Additionally, historic content metrics can offer benefits to users and content providers. For example, historic content metrics can be the basis for trend analysis. As a further example, information about whether content is increasing or decreasing in popularity can be valuable in making decisions about consuming and distributing content. Historic social data can be valuable to users and providers as well. For example, information about which social contacts viewed and enjoyed a particular movie on what day, or information that every X day for the last Y weeks more of a user's social contacts are tuning into to watch particular content. This information can be extremely valuable to the user and the content provider in making decisions about consuming and distributing content.

In one aspect, historic content metrics can comprise content metrics previously collected (e.g., collected more than X number of seconds, minutes, days ago). Historic content metrics can comprise a history, change, trend, pattern, and/or the like of content metrics over time. For example, historic content metrics can comprise the number of views of particular content, a history of views of content related to particular content, a history of content rated by a user, and the like. External analytics 114 can comprise content metrics obtained from an external source. In an aspect, internal social data 116 can comprise data obtained from a social network operated by the content provider 109. In contrast, external social data 118 can comprise data obtained from a social network outside control of the content provider 109. The content player 102 can be configured to retrieve social data 116 and 118 and analytics 112 and 114 based on user preferences. In another aspect, the content player 102 can be configured to receive social data 116 and 118 and analytics 112 and 114 automatically sent to the content player 102.

In an aspect, the data display element 110 can be an overlay to content 104. The data display element 110 can be displayed in a window blocking the user's view of a portion of the content. Alternatively, the data display element 110 can be displayed in a dedicated portion of the screen, such as proximate to one or more sides of the content. The data display element 110 of the screen can be displayed for a time duration determined by the user or other time. The data display element 110 can be presented in variety of ways including, but not limited to, fading in, swirling in, bouncing in, twirling in, flashing in, popping in, sliding across the display, and the like. An example data display element 110 can include an opaque background capable of making text readable as it is overlaid onto the content 104. The data display element 110 can be placed in a discreet location to prevent substantial disruption of the underlying content 104.

In an aspect, the data display element 110 can be configured to render user interface elements such as input boxes and buttons that users can interact with to post comments, indicate interest, or otherwise create data related to an the content. Rendering of interface elements can be provided by library APIs such as Javascript or jQuery when working with content players 102 built in HTML. Alternatively, rendering of interface elements can be provided by C# when working with content players 102 built in .NET, or rendering can be provided by Objective C within content players 102 built in the Mac environment.

In an aspect, the system can further comprise a social data element 120. The social data element 120 can be configured for obtaining internal social data 116 and external social data 118. The social data element 120 can be configured for obtaining internal social data 116 from a local social data server 122 and external social data 118 from one or more external social network servers 124. External social network servers 124 can comprise servers hosted by social media services, such as Facebook, Twitter, Google+, Pinterest, and the like. In an aspect, both internal social data 116 and external social data 118 can comprise comments relevant to particular content 104. For example, a user may rate the content 104, raise questions, and otherwise discuss his or her ideas relevant to the content 104. Additionally, both internal social data 116 and external social data 118 can comprise comments relevant to a user or particular set of users. For example, a user in Denver watching a Colorado Rockies' game on television might warn other users that a rainout is imminent because of a storm coming from his side of town.

In an aspect, the social data element 120 can communicate to a local social data server 122. The local social data server 122 can be a server maintained by the content provider. The social data element 120 can receive comments and/or interest levels from the data display element 110 and send the comments and/or interest levels to the local social data server 122 or external social network server 124. Additionally, the social data element 120 can poll or receive pushed data from the social data servers 122 and/or 124 for new social data 116 and/or 118 (whether it is global or relationship based data). If any new social data 116 and/or 118 is received from the social data servers 122 and/or 124, the social data element 120 can make available the new social data 116 and/or 118 to the user through the data display element 110.

In an aspect, the social data servers 122 and 124 can respond to requests from the social data element 120. Additionally, the local social data server 122 can read, write and maintain internal social data 116 in a distributed database 126 or other suitable storage device. In an aspect, the database 126 can be used for high performance of reads and writes. Furthermore, one or more of the content 104, an identifier of the content, a time offset identifying a time corresponding to one or more frames or other portion of the content that the user has associated with a comment or expression, and other relevant information can be stored with the internal social data 116 in the database 126.

In an aspect, the data display element 110 and social data element 120 can provide users an interface to manage relationships with other internal users. The social data element can communicate with a relationship manager 125 in the local social data server 122. The relationship manager 125 can organize and facilitate the creation of social relationships among users. Relationship integration of social data can also be provided with external social network servers 124 such as Facebook, Twitter, Google+ and other social networks. For example, a user can sign-in to Facebook and comment on content the user is viewing to communicate with the user's Facebook friends. Accordingly, the social data element 120 can communicate with Facebook's external social networks server 124 to post comments on the Facebook wall of one or more of the user's Facebook friends. In one aspect, the social data element 120 can communicate to the external social network server 124 via the local social data server 122. In another aspect, global social data relevant to a set of users can also be delivered to the user's Facebook wall. For example, the following can be posted on a user's Facebook wall: "Allen has joined 92,233 people in Denver to watch American Idol."

In one aspect, internal social data 116 and/or external social data 118 can be provided at the data display element 110 in combination with historic content metrics and real-time content metrics. One example of historic content metrics can be historic viewership numbers on regularly occurring content (e.g., a sitcom). For example, viewership of particular content can be shown as increasing or decreasing over time. In another aspect, historic content metrics can comprise aggregation counters over time. An example of combining historic content metrics with internal social data 116 and/or external social data 118 can comprise, "X friends have watched this episode over the last month." In one aspect, historic content metrics can be combined with real-time content metrics. For example, a real-time content metric can comprise "Right now there are X people watching channel Y." This real-time content metric can be combined with social data, for example, as "Right now X of my friends are watching channel Y." Along with real-time content metrics, a historic content metric can be provided, such as "Z percentage less users (or Z percentage less of my friends) are watching this particular content as compared to the same time last week."

The system can comprise an analytic element 128. The analytic element 128 can comprise an analytics engine. In an aspect, the analytic element 128 can be configured for obtaining internal analytics 112 and/or external analytics 114. For example, the analytic element 128 can be configured to obtain internal analytics 112 from a local analytic server 130 and external analytics 114 from one or more external analytic servers 132. It should be noted that as used herein a server can be any computing device. In another aspect, the analytics element 128 can be configured to obtain internal analytics 112 and external analytics 114 from the local social data server 122. For example, the local social data server 122 can obtain the internal analytics 122 from the local social analytics server 130 and the external analytics 114 from one or more external analytic servers 132. The local analytic server 130 can be one of a cluster of analytic servers. The local analytic server 130 can calculate and maintain relevant information such as content views per region or content views per device type. For example, the local analytic server 130 can record in real-time how many users are watching particular content such as the movie "Avatar" in a particular city such as Denver. The local analytic server 130 can also maintain historic content metrics. For example, "A total of X people have watched Avatar on iPads", or "X of my friends have watched Avatar".

In one aspect, external analytics 114 can be accessed through an API and cached internally (e.g., by the asset metadata manager 127). External analytics can comprise content ratings such as third party compiled ratings, box office ratings, audience voted ratings, ratings by critics and the like. In another aspect, external analytics 114 can comprise information such as how many social media users commented, posted, tweeted, liked, interacted with, and the like in association with a particular content during a given time period. As another example, external analytics 114 can comprise information about what social media users are commenting on, tweeting, liking, posting, interacting with, and the like in relation to a set of rated content (e.g., top X number of movies in terms of popularity).

In an aspect, internal analytics 112 can comprise metrics collected by the content player 102. The analytic element 128 can perform real-time analysis on metrics as they are received from the content player 102. The content player 102 can send metrics such as channel change time, errors, acquiring license, and other relevant information to the analytic element. The analytic element 128 can also send heartbeats at predetermined intervals, for example, every 60 seconds. In one aspect, the heartbeats can be a convenient way to discover if a content player 102 is active at a given time interval. For example, if a content player 102 is tuned to particular content at an optimal bitrate, it can be difficult for the local analytic server 130 to monitor whether the content player is active or has disconnected and is no longer streaming video. Heartbeats can comprise diagnostic information such as current bitrate, current frame rate, and other important diagnostics. Accordingly, heartbeats can be communicated to the local analytic server 130 or other device. When a user is viewing content, metrics can additionally comprise a unique content id(s) identifying the content being viewed by the user.

In an aspect, the local social data server 122 can comprise an asset metadata manager 127. In one aspect, the local social data server 122 can receive and handle requests which will contain a unique asset identifier. In handling these requests, the local social data server 122 can communicate with the asset metadata manager 127. Given a unique asset identifier the asset metadata manager 127 can return any and all stored metadata relevant to a unique asset identifier such as content information about the asset (e.g., title, synopsis, etc), internal and external analytic servers' data, any related internal social data, and the like. The asset metadata manager 127 can communicate and/or cache data from any internal analytic servers 130 and/or external analytics servers 132. Additionally, the asset metadata manager 127 can also cache content information provided by the content provider's internal databases 126.

In an aspect, the network 108 can enable a social data element 120 to communicate with the local social data server 122 and external social network server 124. Additionally, the network 108 can enable the analytic element 128 to communicate with the local analytic server 130 and external analytic server 132. Alternatively, the network 108 can enable the local social data server 122 to communicate with the local analytics server 130 and the external analytics server 132. Accordingly, the network 108 can enable the analytic element 128 to communicate with the local social data server 122. Furthermore, the content player 102 can be implemented as a computer through content player software and content player data as described in FIG. 6.

It should be noted that, in some configurations, the content provider 109 can comprise one or more elements of the content player 102, such as the social data element 120, message element 115, and analytic element 128. Thus, the content provider 109 and/or the content player 102 can determine the content currently being consumed by a user, aggregate information, and provide a message based on the aggregated information concurrently with content to the user. For example, the content provider 109 can comprise a network based digital video recording device, video on demand server, or other similar content delivery platform. In one implementation, the content provider 109 can provide the message to the content player 102, and the content player 102 can provide the message concurrently with the content to the user. In another implementation, the content provider 109 can provide the content player 102 with the message imbedded in the content.

Figure 2:
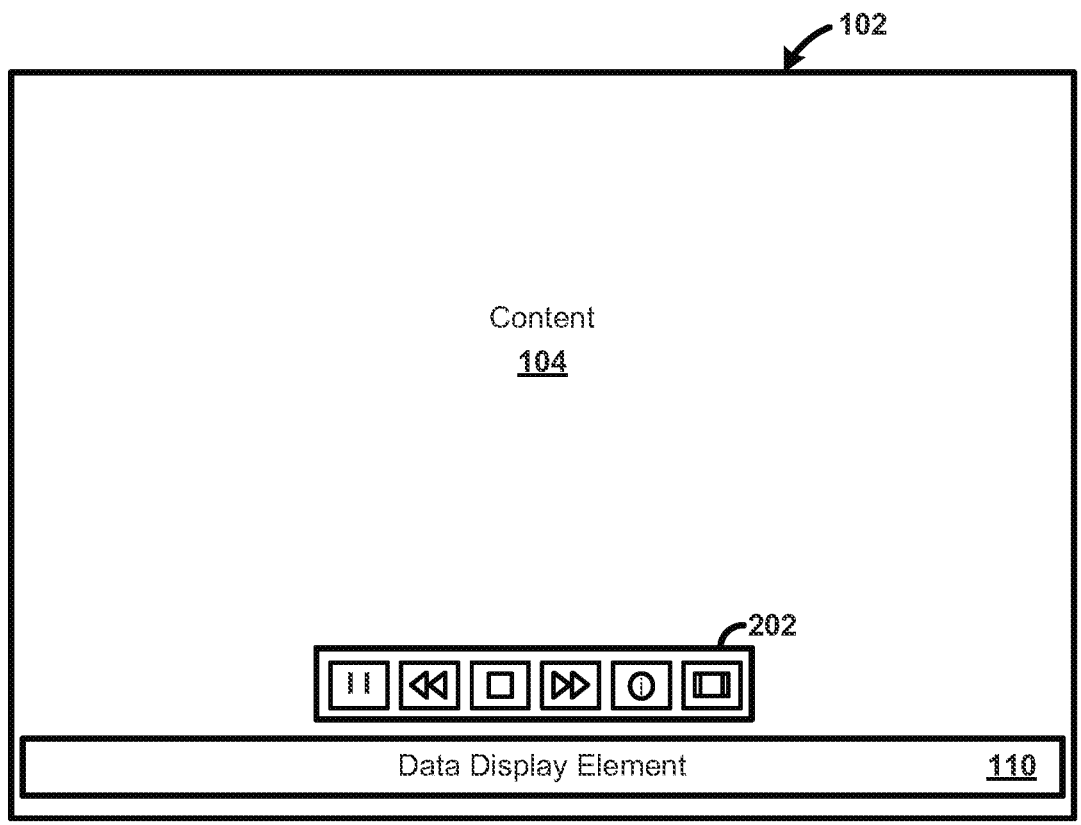
FIG. 2 illustrates a display of an exemplary content player and data display element.

FIG. 2 illustrates a display of an exemplary content player 102 and data display element 110. In one aspect, the user can view content 104 with the data display element 110. The content 104 can be, for example, live content or pre-recorded content. The content player 102 can comprise user controls 202 such as pause, play, rewind, fast-forward, information and other typical controls for manipulating content 104. Additionally, the content player 102 can comprise a data display element 110. The data display element 110 can display information concurrently content such as the number of other users currently viewing content 104 in the local area; however, this example is just one of many ways to integrate content with social data.

For example, users watching the super bowl can view different kinds of social data and analytics via the data display element 110 on their content player 102. In this aspect, examples of social data and analytics can include, but are not limited to: total viewers since start of the game; viewership is now increasing/decreasing; total number of friends watching; specific friend/contact is now watching, and the like. In another example, the data display element 110 can display: You have just joined X number of viewers in state Y watching Content Z. For viewers watching via a particular device, such as an iPad, the data display element 110 can display: Your iPad has just joined X number of iPads in state Y for a total of Z number of views nationally.

Figure 3:
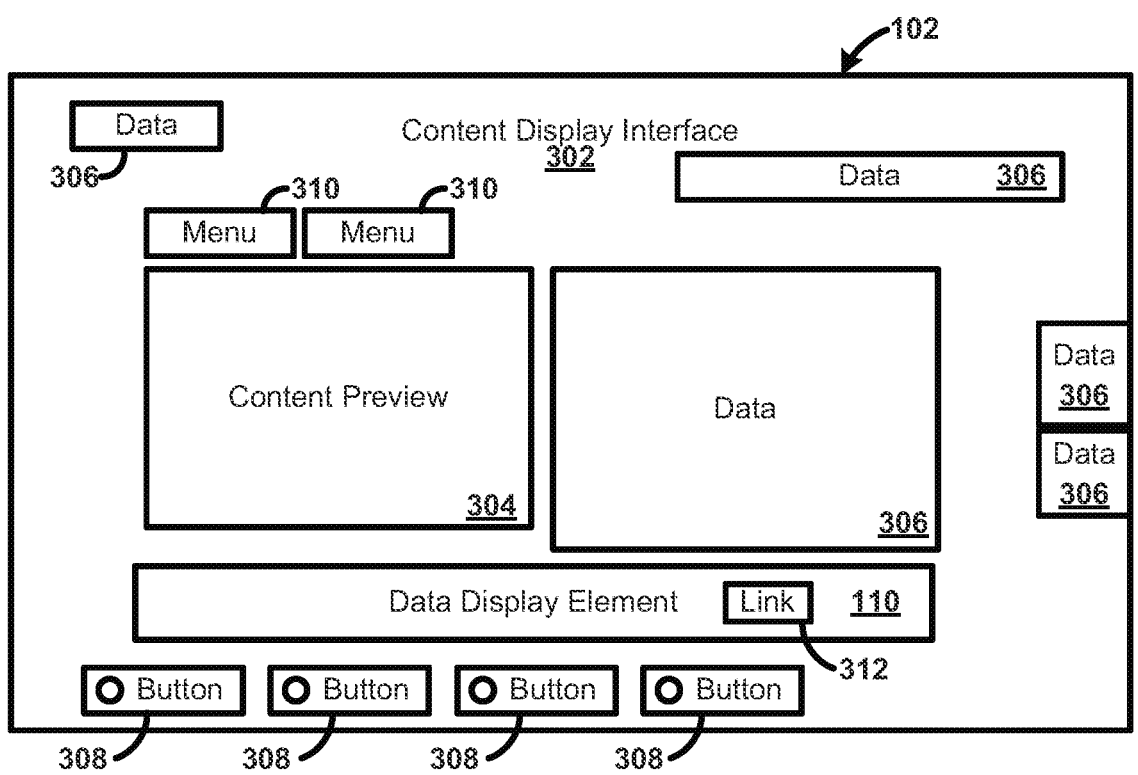
FIG. 3 illustrates a display of another exemplary content player and data display element.

FIG. 3 illustrates a display of another exemplary content player 102 and data display element 110. In an aspect, the content player 102 can provide content 104 to the user through video on demand (VOD) with a data display element 110 displayed concurrently with a content display interface 302. VOD service can be provided through a smart TV, XBOX, cable box, web browser, or other similar device or software. In another aspect, the content display interface 302 can be configured as a content guide for content currently being delivered through the network to the content player 102 (e.g., as one or more channels). The content display interface 302 can comprise, for example, a content preview box 304 and various data boxes 306 displaying background information about the content 104 selected by the user. The content display interface 302 can additionally comprise one or more interface elements such as user buttons 308 and menus 310 configured to facilitate browsing of content 104 and content information. The data display element 110 can display comments from one or more other users along with information such as the time the other users made the comment, the name of the other users, and the like. Additionally, analytics can be displayed such as the number of other users who are currently watching and/or who have watched specific content in a certain amount of time. For example, the data display element 110 can display: On X day of the week at Y time your friend Z said, "This is a must see! 3Thumbs up!" Another example can be, X number other friends are currently viewing (or have viewed) this in the past Y number months. Other examples include: X people are watching (or have watched) this series, X people in the last Y days have "liked" this movie, and this series is increasing in popularity.

In an aspect, relationship based social data can be provided on the data display element 110. As an example, user W's content player 102 can comprise a video on demand device having content such as movie X. The content player 102 can provide a content display interface 302 with a link to movie X. User W can interact with the content display interface 302 by clicking on the link to movie X. After user W clicks on the link to movie X, the content display interface 302 can be updated to include information relevant to movie X. On the content display interface 302, the data display element 110 can appear with a message that includes a comment or expression from user Y. The comment or expression can also be accompanied by analytics. For example, the analytics can include information such as your friend user Y watched this episode. The analytics can be accompanied by the expression, such as user Y enjoyed movie X, and/or a comment, such as user Y says, "This is a great movie."

After user W begins viewing movie X, the data display element 110 can provide further analytics and/or social content. For example, the data display element 110 can appear by sliding in over the video and displaying a comment from user Y. Additionally, user W can input her own comment and/or expression associated with a particular scene of movie X or with movie X as a whole. For example, user W can provide an expression such as that she "likes" user Y's comment. User W can also send user Y a comment through an internal social network or external social network by inputting her comment into the content display interface 302 or data display element 110. In one aspect, user W can choose whether to post the comment publicly for all users to see, for only a specified group of users on the social network to see, or for only user Y to see.

In an aspect, a link 312 can be provided to discover additional analytics, social data, or other relevant information. An exemplary link 312 can be displayed on the data display element 110. For example, the link 312 can comprise an underlined phrase such as, "Click to view details." In an aspect, the link 312 can provide further analytics and social data by updating the data display element 110. In another aspect, the link 312 can provide further access to analytics and social data through an additional display window. The link 312 can provide users the opportunity to access and discover additional external analytics, internal analytics, external social data, and/or internal social data.

Figure 4:
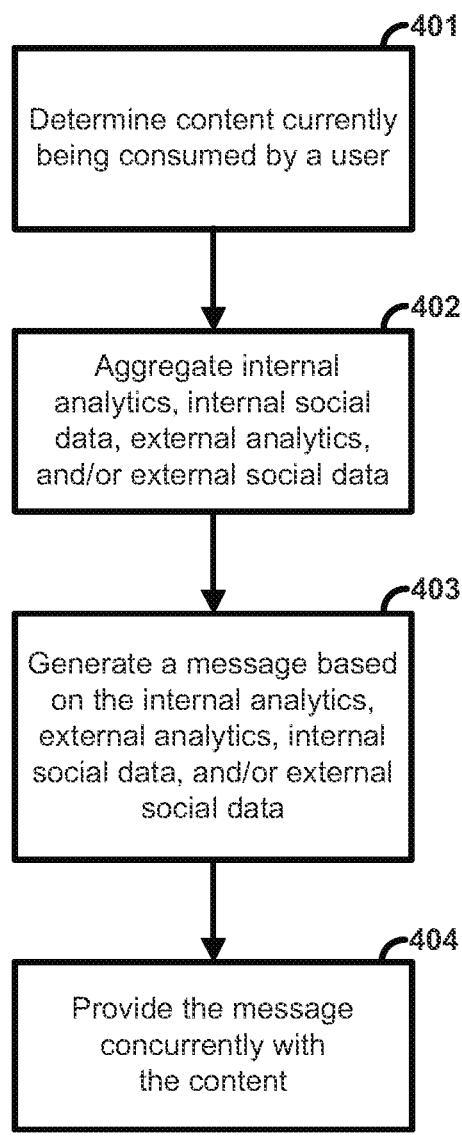
FIG. 4 is a flowchart illustrating an exemplary method for providing supplemental data.

FIG. 4 is a flowchart illustrating an exemplary method for providing supplemental data. In step 401, content currently being consumed by a user can be determined. For example, content can comprise one or more of audio, video, an image, an electronic book, data, and the like. In step 402, internal analytics, external analytics, internal social data, and/or external social data can be associated with the user and the content. In one aspect, internal analytics can comprise at least one of real-time content metrics and historic content metrics. Internal social data can comprise data obtained from a social network operated by the content provider. In another aspect, external social data can comprise data obtained from a social network outside control of the content provider.

In step 403, a message can be generated based on one or more of the internal analytics, the external analytics, the internal social data, and/or the external social data. The message can comprise text, computer code, hyperlinks, images, audio, video, and the like. In one aspect, step 403 can be performed based on user preferences. For example, a user preference can specify which of the internal analytics, external analytics, internal social data, and/or external social data can be the basis of the message. As another example, the user preference can specify that the user prefers messages based on external social data from a particular social media server, and thus, the message can be generated based on the specified external social data. Similarly, the user preference can specify particular internal analytics, external analytics, and/or internal social data. Additionally, the message can be based on other user preferences such as preference specified by a current user, time preferences, bandwidth preferences, and the like.

In step 404, the message can be provided concurrently with the content. For example, step 404 can comprise rendering the message in an overlay. In one aspect, the overlay can be displayed above the content. In another aspect, the message can be provided on a secondary device, such as a laptop computer or a smartphone.

Figure 5:
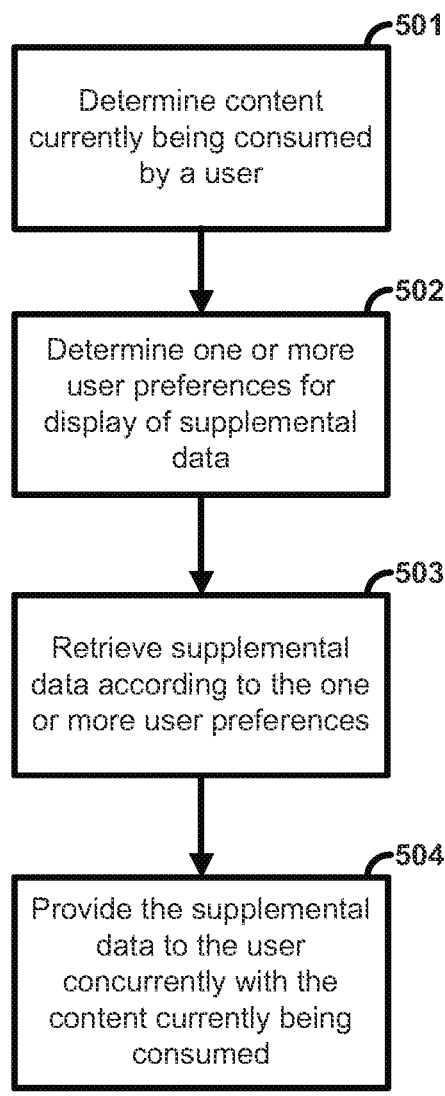
FIG. 5 is a flowchart illustrating another exemplary method for providing supplemental data.

FIG. 5 is a flowchart illustrating another exemplary method for providing supplemental data. In step 501, content currently being consumed by a user can be determined. Content can comprise one or more of audio, video, an image, and an electronic book, and the like. In step 502, one or more user preferences for display of supplemental data can be determined. In an aspect, supplemental data can comprise one or more of internal analytics, external analytics, internal social data, and external social data. Internal analytics can comprise, for example, real-time content metrics. External analytics can comprise content metrics obtained from an external source. In an aspect, internal social data can comprise data obtained from a social network operated by the content provider. In contrast, external social data can comprise data obtained from a social network outside control of the content provider.

In step 503, supplemental data can be retrieved according to the one or more user preferences. In step 504, supplemental data can be provided to the user concurrently with the content currently being consumed, either on the same device or on a secondary device. In an aspect, providing the supplemental data concurrently with the content can comprise rendering the supplemental data in an overlay. Additionally, the method of FIG. 5 can further comprise aspects associated with the systems and methods described herein.

Figure 6:
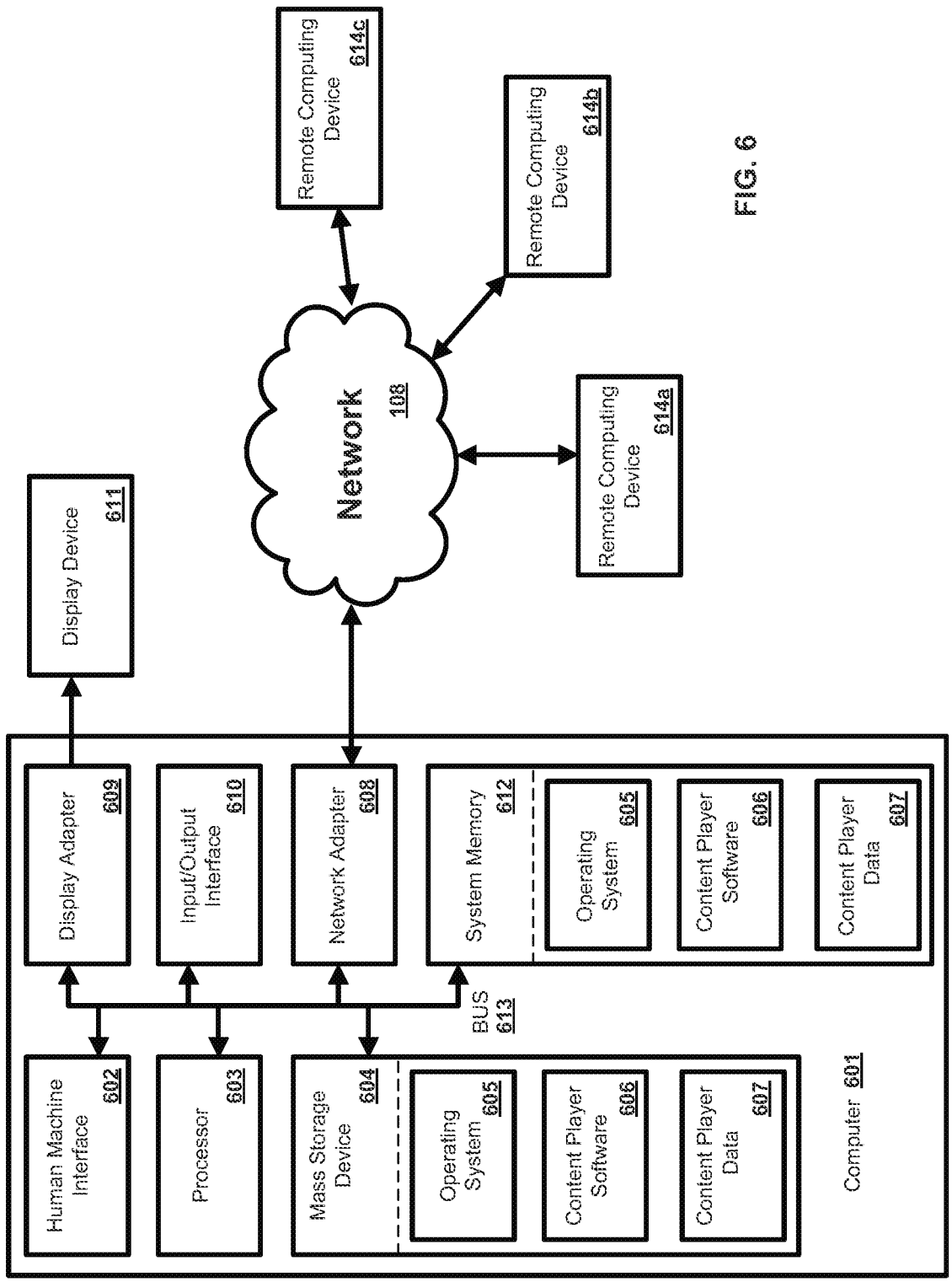
FIG. 6 is a block diagram illustrating an exemplary computer configured to implement methods and systems for providing supplemental data.

In an exemplary aspect, the methods and systems can be implemented on a computer 601 as illustrated in FIG. 6 and described below. By way of example, content player 102 of FIG. 1 can be a computer as illustrated in FIG. 6. The content player 102 can also be a software component. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, content player software 606, content player data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as content player data 607 and/or program modules such as operating system 605 and content player software 606 that are immediately accessible to and/or are presently operated on by the processing unit 603. In an aspect, content player data 607 can comprise supplemental data and can be stored in whole or in part on computer 601 and/or one or more remote computing devices 614a, 614b, and 614c.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and content player software 606. Each of the operating system 605 and content player software 606 (or some combination thereof) can comprise elements of the programming and the content player software 606. Content player data 607 can also be stored on the mass storage device 604. Content player data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 108, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of content player software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, from a first user device, a message, social metadata, and timing information associated with a time point in a video content item;
   determining, based on the social metadata, a second user associated with a first user of the first user device;
   determining that a second user device of the second user is outputting the video content item at the time point; and
   causing, based on the determination that the second user device is outputting the video content item at the time point, output of the message and an indicator associated with the video content item at the second user device concurrently with the video content item.

2. The method of claim 1, wherein the message comprises at least one of: a comment based on the video content item, a comment based on a user preference, a comment based on the video content item and based on a user preference, or information indicating another user viewed the video content item.

3. The method of claim 1, wherein the indicator is based on one or more of an identifier of a source of the message, an expression of one or more users, social data, an interest level associated with the video content item, or metrics associated with the video content item.

4. The method of claim 3, wherein the metrics are based on one or more of viewership, channel changes, or license information.

5. The method of claim 1, wherein receiving the message, the social metadata, and the timing information comprises receiving the message from a social network that comprises an external social network outside control of a content provider.

6. The method of claim 1, wherein receiving the message, the social metadata, and the timing information comprises receiving an offset indicative of a time corresponding to one or more frames of the video content item associated with the message.

7. The method of claim 6, wherein causing output of the message and the indicator associated with the video content item at the second user device concurrently with the video content item comprises determining that the video content item being output corresponds with the offset.

8. The method of claim 1, wherein causing output of the message and the indicator associated with the video content item at the second user device concurrently with the video content item comprises causing output of the message as an overlay to the video content item.

9. A method comprising:
   causing, by a first user device, output of a video content item;
   receiving, during output of the video content item, a message;
   based on the message, determining social metadata, an indicator, and timing information associated with a time point in the video content item; and
   sending, to a computing device, the message, the indicator, the social metadata, and the timing information associated with the video content item, wherein the computing device determines, based on the social metadata, that a second user device of a second user associated with a first user of the first user device is outputting the video content item at the time point, and wherein the computing device causes the second user device to output the message and the indicator concurrently with the video content item based on the determination that the second user device is outputting the video content item at the time point.

10. The method of claim 9, wherein the message comprises at least one of: a comment based on the video content item, a comment based on a user preference, a comment based on the video content item and based on the user preference, or information indicating another user viewed the video content item.

11. The method of claim 9, wherein the indicator is based on one or more of an identifier of a source of the message, an expression of one or more users, social data, an interest level associated with the video content item, or metrics associated with the video content item.

12. The method of claim 9, wherein the message comprises information that indicates that the message is associated with an external social network outside control of a content provider of the video content item.

13. The method of claim 9, wherein sending the message, the social metadata, the indicator, and the timing information comprises sending an offset indicative of a time corresponding to one or more frames of the video content item associated with the message.

14. A system comprising:
   a first user device, configured to:
     cause output of a video content item,
     receive, during output of the video content item, a message,
     determine, based on the message, social metadata, an indicator, and timing information associated with a time point in the video content item, and send the message, the social metadata, the indicator, and the timing information associated with the video content item; and
a computing device, configured to:
receive the message, the social metadata, the indicator, and the timing information associated with the time point in the video content item,
determine, based on the social metadata, a second user associated with a first user of the first user device,
determine that a second user device of the second user is outputting the video content item at the time point, and
cause, based on the determination that the second user device is outputting the video content item at the time point, output of the message and the indicator at the second user device concurrently with the video content item.

15. The system of claim 14, wherein the message comprises at least one of: a comment based on the video content item, a comment based on a user preference, a comment based on the video content item and based on a user preference, or information indicating another user viewed the video content item.

16. The system of claim 14, wherein the indicator is based on one or more of an identifier of a source of the message, an expression of one or more users, social data, an interest level associated with the video content item, or metrics associated with the video content item.

17. The system of claim 14, wherein the computing device is configured to receive the message, the social metadata, the indicator, and the timing information from a social network that comprises an external social network outside control of a content provider.

18. The system of claim 14, wherein the computing device is configured to receive the message, the social metadata, the indicator, and the timing information based on an offset indicative of a time corresponding to one or more frames associated with the message.

19. The system of claim 18, wherein the computing device is configured to cause the output of the message and the indicator at the second user device concurrently with the video content item based on a determination that the video content item being output corresponds with the offset.

20. The method of claim 11, wherein the metrics are based on one or more of viewership, channel changes, or license information.

21. The method of claim 1, wherein the social metadata comprises information indicative of a group of users in a social network of the first user of the first user device.

22. The method of claim 1, wherein the group of users are associated with one or more attributes of the first user of the first user device, wherein the one or more attributes comprise one or more of location information, content viewing behavior, or demographic information.

23. The method of claim 9, wherein the social metadata comprises information indicative of a group of users in a social network of the first user of the first user device.

24. The method of claim 9, wherein the group of users are associated with one or more attributes of the first user of the first user device, wherein the one or more attributes comprise one or more of location information, content viewing behavior, or demographic information.

25. The system of claim 14, wherein the social metadata comprises information indicative of a group of users in a social network of the user of the first user device.

26. The system of claim 14, wherein the group of users are associated with one or more attributes of the first user of the first user device, wherein the one or more attributes comprise one or more of location information, content viewing behavior, or demographic information.

* * * * *